March 4, 1941. B. MAYER 2,233,673
VALVE DEVICE
Filed Feb. 24, 1939 2 Sheets-Sheet 1

Inventor
Béla Mayer
J. Friedman
Atty.

March 4, 1941. B. MAYER 2,233,673
VALVE DEVICE
Filed Feb. 24, 1939 2 Sheets-Sheet 2

Inventor
Béla Mayer

Atty.

Patented Mar. 4, 1941

2,233,673

UNITED STATES PATENT OFFICE 2,233,673

VALVE DEVICE

Béla Mayer, Budapest, Hungary, assignor to Irving Graef, New York, N. Y.

Application February 24, 1939, Serial No. 258,159
In Hungary February 24, 1938

6 Claims. (Cl. 251—50)

The invention relates to improvements in valves, particularly to through-way valves, especially for use in vapour and gas pipes.

In the known valves of this type a replacement of the packing has only been possible in such a manner that the burnt-in or stuck-in packing gland had to be forced out from the packing box by the application of force. The ring thus lifted had, in the case of vertically arranged valve spindle, to be suspended in order that the necessary open space should be available for the insertion of the packing.

Furthermore, in the known types of such valves the packing box was made integral with the upper part of the valve which had, for economical reasons, to be made of cast material. Thus the employment of more refined non-porous massive materials for making the packing box was not possible.

It is an object of the invention to provide an improved valve, in which an easier control of the packing is assured, by using a packing gland, admitting a positively controlled axial motion in both directions.

It is a further object of the invention to make the packing box of a separate piece which makes it possible to economically employ more refined non-porous materials possible and the upper part of the valve is not subjected to direct heat and to the chemical and other effects of the fluid passing through the valve.

It is a still further object of the invention to provide a connection of the valve spindle and of the valve disk forming a separate body which is simple, inexpensive and safe.

Other objects and the manner in which the same are obtained will appear from the following description.

In the drawings affixed to this specification and forming part thereof two embodiments of the invention are illustrated diagrammatically by way of example.

Figure 1:
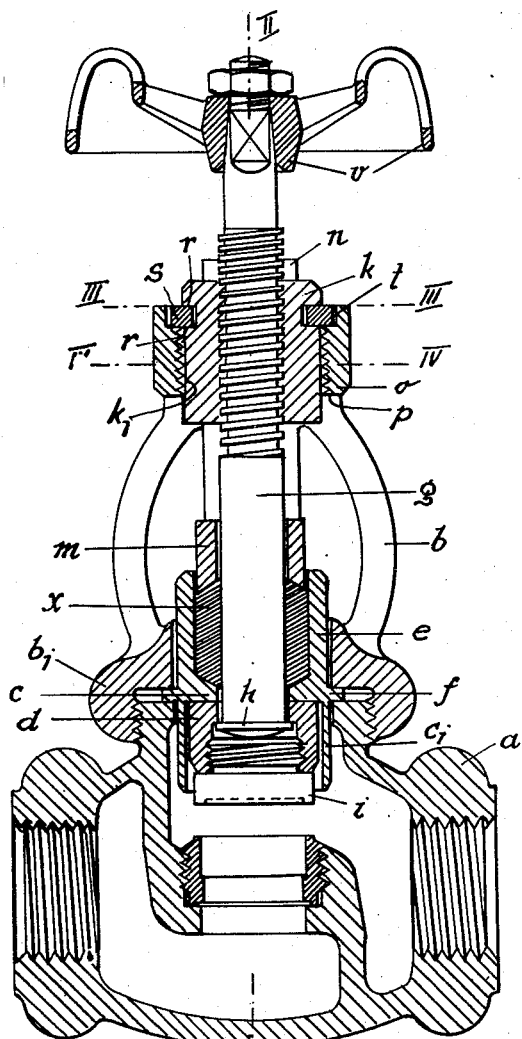
Fig. 1 is a longitudinal section of a valve according to the invention.
Figure 2:
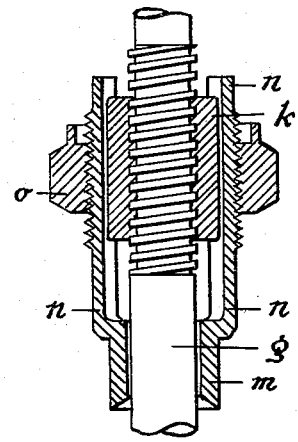
Fig. 2 is a longitudinal section of the upper part of the valve, taken on line II—II of Fig. 1.
Figure 3:
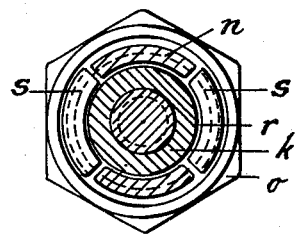
Fig. 3 is a sectional view, taken on line III—III of Fig. 1.
Figure 4:
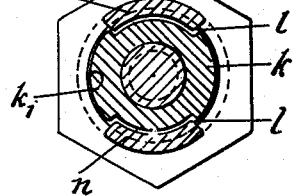
Fig. 4 is a sectional view, taken on line IV—IV of Fig. 1.
Figure 5:
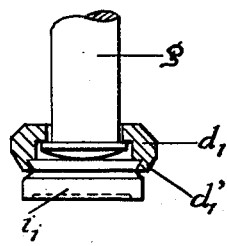
Figure 6:
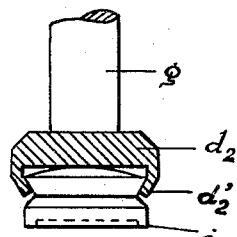

Figs. 5—6 are side views of modifications of the valve disk arrangement.

Figure 7:
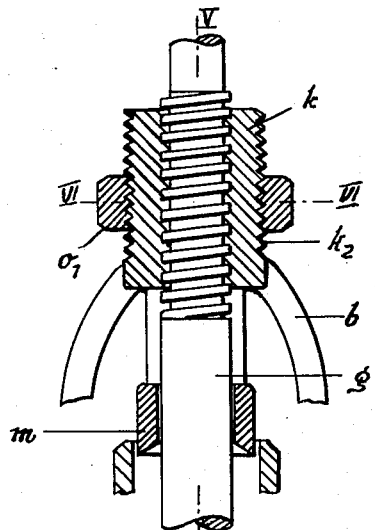

Fig. 7 is a longitudinal section of another embodiment of the upper part of the valve.

Figure 8:
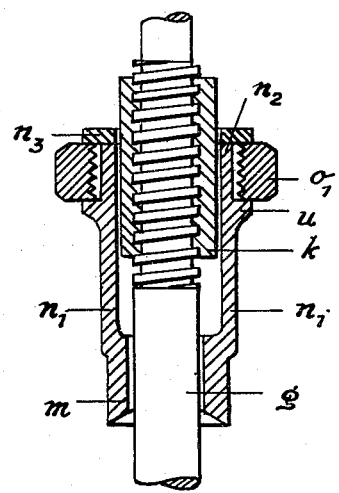

Fig. 8 is a longitudinal section taken on line V—V of Fig. 7, and

Figure 9:
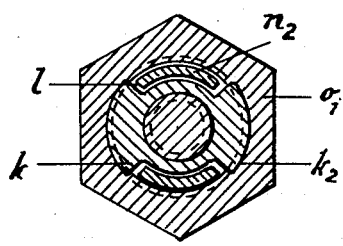

Fig. 9 is a section taken on line VI—VI of Fig. 7.

In Figs. 1 to 4 $a$ designates the valve casing and $b$ the yoke-shaped upper part of the valve. A liner sleeve $c$ is inserted between these two parts, the upper part $e$ forming the packing box and the lower part $c_1$ serving as guide for a valve disk holder $d$. The interior of the valve casing is closed by a packing flange $f$ of the liner sleeve $c$. The use of a separate liner sleeve $c$ independent of the cast upper part of the valve, makes it possible to machine, besides the valve casing, the liner sleeve also from a solid block of metal, e. g., of stainless steel, so that the fluid flowing through the valve will not come into contact with parts made of porous cast material and the valve will be entirely resistant to heat, acids and pressure.

The liner sleeve can also be constructed in such a manner as to dispense with its lower part $c_1$ projecting into the valve casing. This modification is advantageous in the case of valves of small dimensions.

By screwing the socket $b_1$ of the yoke $b$ on the valve casing $a$, the packing flange $f$ of the intermediate sleeve $c$ will be pressed against the valve casing so that a tight packing is ensured. The yoke $b$ consists of two arcuate legs with a head part $k$ which has a threaded central opening for the valve spindle $g$. This spindle holds, at the upper end, a hand wheel $v$ and, at the lower end, a valve disk holder $d$.

The valve disk holder $d$ is suspended on the flange $h$ of the spindle $g$. The valve disk $i$ made of non-rusting and hardened material of high mechanical strength is secured to the disk holder by means of a screw thread and by rolling the lower flange of the disk holder into an annular groove provided on the disk.

In the modification shown in Fig. 5 the valve disk $i_1$ is secured to the disk holder suspended on the flange of the valve spindle $g$ by rolling the flange $d_1'$ surrounding the disk $i_1$ into the V-shaped upper groove of same.

In the modification shown in Fig. 6 no separate valve disk holder is provided, the end of the valve spindle being constructed as a head part $d_2$, the flange $d_2'$ of which is rolled into the V-shaped upper groove of the disk $i_2$.

In all embodiments one of the contact surfaces of the valve disk and of the spindle end will be convex. Thus, even after rolling-in, the valve disk will not be rigid, but will be capable of self-alignment so that safe closing of the valve will be obtained even though the contact surfaces of the valve seat and of the valve disk should not be completely parallel to each other. Furthermore, the valve disk being made of hardened material of high mechanical strength, any fracture or breaking-off of same is prevented.

Referring again to Figs. 1 to 4, in the annular channel between the packing box $e$ and valve spindle $g$ there is provided the packing $x$. The packing $x$ is pressed down by a packing gland $m$ which has two axially projecting extensions $n$. The extensions loosely fit into two longitudinal recesses $l$ of the head part $k$. On the surfaces of the extensions left-hand screw threads are provided which are in engagement with a nut $o$. The nut $o$ is arranged so that it can perform rotary motion only, its axial movement being prevented. To prevent a downward movement, the nut $o$ is supported by the shoulders $p$ of the yoke legs $b$. To prevent an upward movement, ring segments $s$ are provided in an upper circular channel $t$ of the nut, which segments fit into grooves $r$, arranged on the periphery of the head part $k$, between the recesses $l$.

If the nut $o$ is rotated, the extensions $n$ and the packing gland $m$ will perform an axial motion; when the nut is rotated in the right-hand direction the gland $m$ will be lifted and drawn out from the packing box $e$, while if the same is rotated in the left-hand direction the gland will be lowered and the packing $x$ in the packing box $e$ will be compressed. Thus, if the re-packing of the packing box is desired the gland $m$ will be lifted by rotating the nut $o$ in the right-hand direction and then the new packing will be compressed by rotating the nut $o$ in the left-hand direction. The re-packing is facilitated by the arcuate construction of the yoke-legs.

The circular ring segments $s$ can be placed into the grooves only in the screwed-off position of the yoke-shaped upper part. Only in this condition is it possible to lower the extensions $n$ to such a level as to ensure that their upper edges reach the bottom edge of the grooves $r$. In this position the circular ring segments can be slipped down through the recesses $l$ and can be pushed sideways into the grooves $r$. In the position in which the yoke-shaped upper part is screwed-in, i. e. in the operative position of the valve, the upper edge of the extensions $n$ cannot get below the lower edge of the groove $r$ and thus the segments $s$ cannot slip from their places.

Another advantage of the present invention consists therein that, with the exception of the hand wheel $v$, the other parts of the valve cannot be removed during operation by unauthorized persons, because only after screwing-off the yoke-shaped upper part the valve can be taken apart.

In the modification shown in Figs. 7 to 9 the head part $k$ is provided on its surfaces $k_2$ with a screw thread engaging with the nut $o_1$ while the extensions $n_1$ of the valve gland $m$ have smooth surfaces. The nut $o_1$ is rotatably arranged between the projections $u$ of the extensions $n_1$ and a ring $n_3$ fastened to the part $n_2$ of the extensions $n_1$. In this case, the nut $o_1$ may perform rotary as well as axial movements. The lifting and lowering of the packing gland $m$ will be effected by rotating the nut $o_1$ in different senses, the nut performing at the same time an upward or downward movement on the head part $k$.

Various changes may be made in the details disclosed in the foregoing specification without departing from the invention.

I claim:

1. A valve comprising a valve casing, a yoke fastened to said casing, a head part arranged on the upper part of said yoke, having longitudinal recesses and provided with a threaded central opening, a valve spindle in said opening, extending through said opening into said valve casing, and holding at its lower end a valve disk, a packing box forming an annular channel around said spindle, a packing gland surrounding said spindle and fitting into said annular channel, said gland being provided with axially projecting extensions loosely fitting into the recesses of said head part and cooperating with a nut provided on said head part, and adapted to lift and lower said extensions and said gland in the axial direction.

2. A valve according to claim 1, in which said extensions are provided with screw threads engaging with said nut, the nut being arranged to perform rotary movement only.

3. A valve according to claim 1, in which said extensions are provided with screw threads engaging with said nut, said nut being supported by said yoke and having an annular channel in which segments are provided, fitting into grooves arranged on the periphery of said head part between the longitudinal recesses of same.

4. A valve according to claim 1, in which said head part is provided between its longitudinal recesses with a peripheral screw thread engaging with said nut, the latter being rotatably arranged between two projections of said extensions.

5. A valve comprising a valve casing, a yoke fastened to said casing, a head part arranged on the upper portion of said yoke, having longitudinal recesses and provided with a threaded central opening, a valve spindle in said opening, extending therethrough into the valve casing, and holding at its end a valve disk, a liner sleeve between said casing and said yoke, provided with an annular flange supported by the upper surface of said casing, the upper portion of said sleeve forming a packing box, and a packing gland fitting into the annular channel between said packing box and said spindle, said gland being provided with axially projecting extensions, loosely fitting into the recesses of said head part and cooperating with a nut provided on said head part, said nut being adapted to impart a positively controlled motion to said extensions and to said gland in both axial directions.

6. A valve comprising a valve casing, a yoke fastened to said casing, a head part arranged on the upper portion of said yoke, having longitudinal recesses and provided with a threaded central opening, a valve spindle in said opening, extending therethrough into said valve casing, and holding at its lower end a valve disk, a packing box forming an annular channel around said spindle, a packing gland surrounding said spindle and arranged in said annular channel, said gland being provided with axially projecting extensions, loosely fitting into the recesses of said head part and cooperating with means provided on said head part, said means being adapted to impart a positively controlled movement to said extensions and to said gland in both axial directions.

BÉLA MAYER.